United States Patent
Chang et al.

(10) Patent No.: US 9,898,436 B2
(45) Date of Patent: Feb. 20, 2018

(54) DATA TRANSMISSION SYSTEM AND TRANSMISSION METHOD THEREOF INCLUDING CONNECTION AND ORIENTATION DETECTION

(71) Applicants: Chia-Chih Chang, Taipei (TW); Chun-Yen Chen, New Taipei (TW); Ming-Ho Kuo, Hsinchu (TW)

(72) Inventors: Chia-Chih Chang, Taipei (TW); Chun-Yen Chen, New Taipei (TW); Ming-Ho Kuo, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 301 days.

(21) Appl. No.: 14/810,938

(22) Filed: Jul. 28, 2015

(65) Prior Publication Data

US 2016/0335219 A1 Nov. 17, 2016

(30) Foreign Application Priority Data

May 13, 2015 (TW) .............................. 104115194 A (51) Int. Cl.
*G06F 13/40* (2006.01)
*G06F 11/22* (2006.01)

(52) U.S. Cl.
CPC ........ *G06F 13/4068* (2013.01); *G06F 11/221* (2013.01); *G06F 13/409* (2013.01); *G06F 13/4022* (2013.01)

(58) Field of Classification Search
None
See application file for complete search history.

(56) References Cited

U.S. PATENT DOCUMENTS 6,442,734 B1 * 8/2002 Hanson ............... G06F 13/4068
716/108
6,460,094 B1 * 10/2002 Hanson ............... G06F 13/4068
326/37

(Continued)

FOREIGN PATENT DOCUMENTS

CA 2948655 A1 * 12/2015 ............. G06F 13/10
CN 104090198 A * 10/2014

(Continued)

OTHER PUBLICATIONS

'I2C-Cabling' by Brian Hughes, copyright 2013, Analog Devices, Inc.*

(Continued)

*Primary Examiner* — Steven Snyder
(74) *Attorney, Agent, or Firm* — J.C. Patents (57) ABSTRACT

A data transmission system and a transmission method thereof are provided. The data transmission system includes a first electronic apparatus and a second electronic apparatus. The first electronic apparatus includes a first clock pin and a first data pin. The second electronic apparatus includes a second clock pin and a second data pin. In a connecting detection mode, the first electronic apparatus transmits a first detection signal to the first clock pin and drives the first data pin to a reference logic level. The second electronic apparatus transmits a second detection signal to the second clock pin and drives the second data pin to the reference logic level. The first electronic apparatus determines whether the first and the second electronic apparatuses are connected to each other according to whether at least one of signals on the first clock pin and on the first data pin is varied or not.

15 Claims, 8 Drawing Sheets

(56) References Cited

U.S. PATENT DOCUMENTS

| | | | |
|---|---|---|---|
| 2003/0074176 A1* | 4/2003 | Hanson | G06F 13/4068 |
| | | | 703/21 |
| 2011/0243568 A1* | 10/2011 | Lai | G06F 13/385 |
| | | | 398/138 |
| 2013/0115821 A1* | 5/2013 | Golko | H01R 13/516 |
| | | | 439/638 |
| 2013/0304942 A1 | 11/2013 | Golembeski et al. | |
| 2014/0087789 A1* | 3/2014 | Narendra | H04M 1/0274 |
| | | | 455/558 |
| 2014/0145708 A1* | 5/2014 | Wu | G06F 11/221 |
| | | | 324/133 |
| 2014/0218045 A1 | 8/2014 | Shoykhet et al. | |
| 2014/0335729 A1* | 11/2014 | Little | H01R 24/60 |
| | | | 439/607.53 |
| 2015/0363339 A1* | 12/2015 | Huang | G06F 13/10 |
| | | | 710/33 |
| 2016/0217092 A1* | 7/2016 | Huang | G06F 13/10 |
| 2016/0267044 A1* | 9/2016 | Wu | G06F 13/4022 |
| 2017/0010988 A1* | 1/2017 | Chao | G06F 13/1668 |
| 2017/0024350 A1* | 1/2017 | Burgers | G06F 13/4072 |
| 2017/0139871 A1* | 5/2017 | Yeh | G06F 13/4081 |

FOREIGN PATENT DOCUMENTS

| | | | | |
|---|---|---|---|---|
| EP | 0887737 A2 | * | 12/1998 | ........... G06F 13/409 |
| GB | 201321012 | * | 1/2014 | ......... G06F 13/4072 |
| GB | 2527481 A | * | 12/2015 | ......... G06F 13/4072 |
| JP | 07015157 A | * | 1/1995 | |
| TW | 201142599 | | 12/2011 | |
| TW | 201315149 | | 4/2013 | |
| TW | 201332232 | | 8/2013 | |
| TW | 201617913 A | * | 5/2016 | |
| WO | WO 2015079215 A1 | * | 6/2015 | ......... G06F 13/4072 |

OTHER PUBLICATIONS

'I2C-It Y-Cable Harness' by Solarbotics, archived from 2012.*
'4pin anti-reverse cable—30 cm, for Arduino I2C/COM' by elechouse, Mar. 12, 2010.*
'Universal Serial Bus Type-C Cable and Connector Specification—Revision 1.2' Mar. 25, 2016.*
"Office Action of Taiwan Counterpart Application", dated Jun. 27, 2016, p. 1-p. 3.

* cited by examiner

DATA TRANSMISSION SYSTEM AND TRANSMISSION METHOD THEREOF INCLUDING CONNECTION AND ORIENTATION DETECTION

CROSS-REFERENCE TO RELATED APPLICATION

This application claims the priority benefit of Taiwan application serial no. 104115194, filed on May 13, 2015. The entirety of the above-mentioned patent application is hereby incorporated by reference herein and made a part of this specification.

BACKGROUND

Field of the Invention

The invention is related to a data transmission system and a method thereof and more particularly, to a data transmission system and a method thereof capable of providing multi-direction connection to electronic apparatuses.

Description of Related Art

With the rapid development of information technologies, as well as the progress of various types of electronic apparatuses and a variety of functions equipped therewith, the electronic apparatuses have become more and more inseparable with people's life. Generally, a user can connect two electronic apparatuses with each other for information communication or data transmission to expand functions of the electronic apparatuses through various general purpose transmission interfaces (e.g., a universal serial bus (USB)) complying with a variety of specification standards, including Type A, Type B, Mini-B, Micro-A and Micro-B, and D-subminiature connectors complying with a variety of specification standards, including DA-15, DB-25, DC-37, DD-50 and DE-9, or other transmission interfaces with other specific specifications of the electronic apparatuses.

However, in the conventional connection interfaces, pin positions of the electronic apparatuses have to be corresponding to each other, for example, data pins or clock pins of the two electronic apparatuses have to be connected with each other, so as to implement the data transmission. Thus, in a general scenario, two electronic apparatuses have to be connected in a fixed direction (i.e., a forward direction) when performing the data transmission between each other, which cause inconvenience to the users. As such, even though more corresponding pins can be increased for the data transmission when the connection direction is a reverse direction; however, the increase of the pin count would result in higher manufacturing cost.

SUMMARY

The invention provides a data transmission system and a data transmission thereof, which can facilitate in connecting electronic apparatuses in a plurality of directions for perform operations.

According to an embodiment of the invention, a data transmission system including a first electronic apparatus and a second electronic apparatus is provided. The first electronic apparatus has a first connection interface with a first clock pin and a first data pin disposed thereon. The second electronic apparatus has a second connection interface with a second clock pin and a second data pin disposed thereon. In a connecting detection mode, the first electronic apparatus transmits a first detection signal to the first clock pin and drives the first data pin to a reference logic level. The second electronic apparatus transmits a second detection signal to the second clock pin and drives the second data pin to the reference logic level. The first electronic apparatus determines whether the first and the second electronic apparatuses are connected to each other according to whether at least one of signals on the first clock pin and on the first data pin is varied.

In an embodiment of the invention, when the first and the second electronic apparatuses are connected with each other, the first electronic apparatus determines connecting direction information of the first and the second electronic apparatuses according to whether the signal on the first data pin is maintained at the reference logic level.

According to an embodiment of the invention, a data transmission system including a first electronic apparatus and a second electronic apparatus is provided. The first electronic apparatus has first connection interface with a first clock pin and a first data pin disposed thereon. The second electronic apparatus has a second connection interface with a second clock pin and a second data pin disposed thereon. In a connecting detection mode, the first electronic apparatus drives the first clock pin to a first logic level and drives the first data pin to a second logic level. The second electronic apparatus drives the second clock pin and the second data pin to a second logic level. The first electronic apparatus receives the signal on the first clock pin to determine whether the first and the second electronic apparatuses are connected to each other by comparing whether the signal on the first clock pin is maintained at the first logic level.

According to an embodiment of the invention, a data transmission method adapted for data transmission between a first electronic apparatus and a second electronic apparatus is provided. The first electronic apparatus is disposed with a first clock pin and a first data pin. The second electronic apparatus is disposed with a second clock pin and a second data pin. The method includes: in a connecting detection mode, transmitting a first detection signal to the first clock pin to drive the first data pin to a reference logic level, and transmitting a second detection signal to the second clock pin to drive the second data pin to the reference logic level; and determining whether the first and the second electronic apparatuses are connected to each other according to whether at least one of signals on the first clock pin and on the first data pin is varied.

According to an embodiment of the invention, a data transmission method adapted for data transmission between a first electronic apparatus and a second electronic apparatus is provided. The first electronic apparatus is disposed with a first clock pin and a first data pin. The second electronic apparatus is disposed with a second clock pin and a second data pin. The method includes: in a connecting detection mode, respectively driving the first clock pin to a first logic level and driving the first data pin, the second clock pin and the second data pin to a second logic level; receiving the signal on the first clock pin; and determining whether the first and the second electronic apparatuses are connected to each other by comparing whether the signal on the first clock pin is maintained at the first logic level.

To sum up, in the data transmission system of the invention, when the electronic apparatuses are connected with each other, variation occurring in the signal (the voltage level) of each pin can be detected by means of the detection signal transmitted to each pin (e.g., the clock pin and the data pin). Accordingly, the connection direction between the electronic apparatuses can be determined, and functions of and signals output by the pins of the apparatuses can be correspondingly switched, such that data transmission can be successfully performed between the electronic apparatuses which are connected in either the forward direction or the reverse direction and the convenience in use can therefore be enhanced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
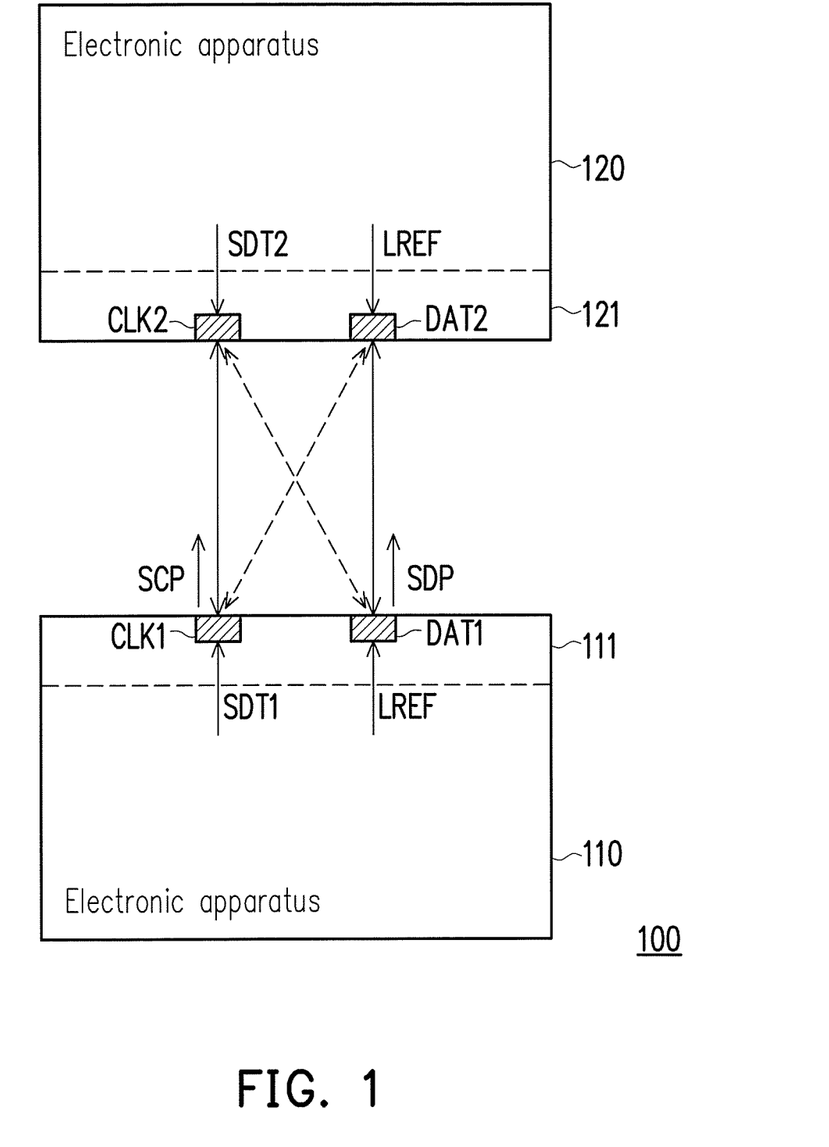
FIG. 1 is a schematic diagram illustrating a data transmission system according to an embodiment of the invention.

Referring to FIG. 1, FIG. 1 is a schematic diagram illustrating a data transmission system according to an embodiment of the invention. A data transmission system 100 includes an electronic apparatus 110 and an electronic apparatus 120. The electronic apparatus 110 may be, for example, a notebook computer, a tablet computer, a smart phone, a personal digital assistant (PDA). The electronic apparatus 120 may be, for example, an electronic apparatus capable of being operated with the electronic apparatus 110 for functional expansion (e.g., a dock or a keyboard), or any electronic apparatus for data transmission with the electronic apparatus 110 through hardware connection, of which the type is not limited in the invention.

The electronic apparatus 110 has a connection interface 111. The connection interface 111 has a clock pin CLK1 and a data pin DAT1 disposed thereon. The electronic apparatus 120 has a connection interface 121. The connection interface 121 has a clock pin CLK2 and a data pin DAT2 disposed thereon. Positions where the clock pin CLK1 and the data pin DAT1 are disposed on the connection interface 111 and positions where the clock pin CLK2 and the data pin DAT2 are disposed on the connection interface 121 may be corresponding to each other, for example. In the embodiment of the invention, when the connection interface 111 of the electronic apparatus 110 and the connection interface 121 of the electronic apparatus 120 are connected with each other, a connecting state (in a forward direction or in a reverse direction) is determined by transmitting a detection signal to each pin, so as to correspondingly adjust a function and an output signal of each pin.

To be specific, in FIG. 1, when the electronic apparatus 110 and the electronic apparatus 120 are connected to each other, the data transmission system 100 may enter a connecting detection mode. In the connecting detection mode, the electronic apparatus 110 may transmit a detection signal SDT1 to the clock pin CLK1 and drive the data pin DAT1 to a reference logic level LREF. The electronic apparatus 120 may transmit a detection signal SDT2 to the clock pin CLK2 and drive the data pin DAT2 to the reference logic level LREF. Therein, the detection signal SDT1 and the detection signal SDT2 have different waveforms and frequencies, which may be pulse width modulation (PWM) signals having different duty cycles respectively, for example. In this case, the electronic apparatus 110 may determine whether the electronic apparatus 110 and the electronic apparatus 120 are connected with each other according to whether at least one of a signal on the clock pin CLK1 and a signal on the data pin DAT1 is varied or not.

Figure 2:
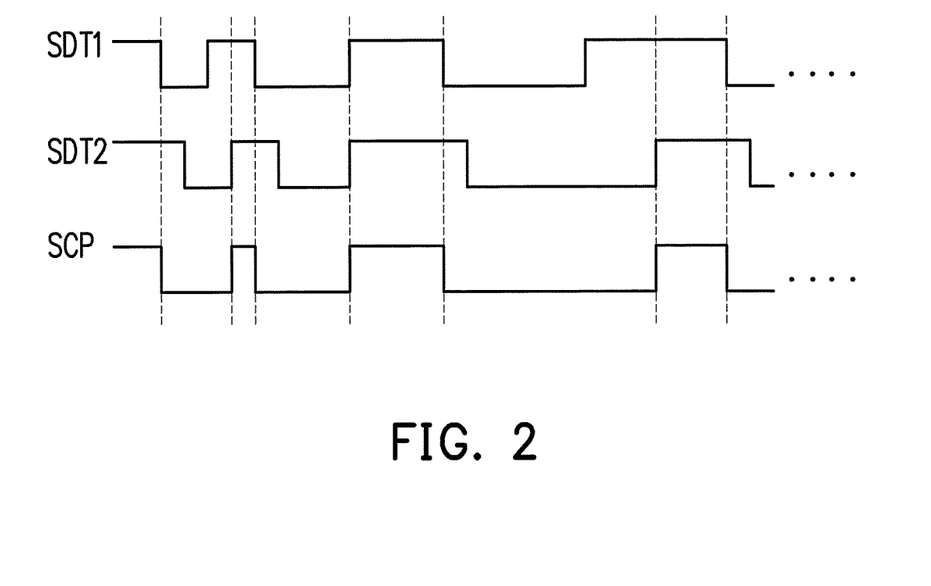
FIG. 2 is a signal timing chart of implementing detection signals according to an embodiment of the invention.

Examples of determining whether the electronic apparatuses are connected with each other will be described with reference to FIG. 1 and FIG. 2. Therein, FIG. 2 is a signal timing chart of implementing detection signals according to an embodiment of the invention. FIG. 2 illustrates the detection signal SDT1 transmitted to the clock pin CLK1 by the electronic apparatus 110, the detection signal SDT2 transmitted to the clock pin CLK2 by the electronic apparatus 120 and a signal SCP on the clock pin CLK1 of the electronic apparatus 110. When the electronic apparatus 110 and the electronic apparatus 120 are not connected, the signal SCP on the clock pin CLK1 is equal to the detection signal SDT1 transmitted to the clock pin CLK1 by the electronic apparatus 110. When the clock pin CLK1 of the electronic apparatus 110 and the clock pin CLK2 of the electronic apparatus 120 are connected with each other (e.g., in a forward direction), as shown in FIG. 2, the signal SCP on the clock pin CLK1 is varied due to being affected by the detection signal SDT2 and becomes a signal having a waveform different from the detection signal SDT1. Thereby, it may be determined that the electronic apparatus 110 and the electronic apparatus 120 are connected with each other.

Additionally, when the data pin DAT1 of the electronic apparatus 110 and the clock pin CLK2 of the electronic apparatus 120 are connected with each other (e.g., in a reverse direction), whether the electronic apparatuses are connected with each other may be determined in another way by means of driving the data pins DAT1 and DAT2 to the reference logic level LREF. For instance, if it is assumed that the data pins DAT1 and DAT2 are pulled up to the reference logic level LREF (e.g., a high logic level) merely by a pull-up voltage, intensities for maintaining the data pins DAT1 and DAT2 at the reference logic level are low. In this circumstance, when the electronic apparatus 110 and the electronic apparatus 120 are connected in the reverse direction, the logic level of the signal SDP on the data pin DAT1 is changed (which are not maintained at the high logic levels, for example) due to being affected by the detection signal SDT2. Thereby, it may be determined that the electronic apparatus 110 and the electronic apparatus 120 are connected with each other.

However, if it is assumed that the data pins DAT1 and DAT2 are driven to the reference logic level LREF (e.g., a low logic level) through controllers built in the electronic apparatuses 110 and 120, the intensities for maintaining the data pins DAT1 and DAT2 at the reference logic level are high. In this circumstance, when the electronic apparatus 110 and the electronic apparatus 120 are connected in the reverse direction, the logic levels of the signal SDP on the data pin DAT1 are not changed (which are still maintained at the low logic levels, for example) due to being affected by the detection signal SDT2. Therefore, the electronic apparatus 110 has to detect the signal SCP on the clock pin CLK1. In this case, the signals SCP are affected by the reference logic level LREF with the high intensity on the data pin DAT2 and tend toward being equal. Thereby, it may be determined that the electronic apparatus 110 and the electronic apparatus 120 are connected with each other.

In the present embodiment, connecting direction information of the electronic apparatuses 110 and 120 may also be determined according to signal variation on the data pin DAT1 or the clock pin CLK1. The connecting direction information includes, for example, a forward connection state and a reverse connection state. In a scenario where the electronic apparatus 110 and the electronic apparatus 120 are determined as being connected with each other, if it is assumed that the data pins DAT1 and DAT2 are pulled up to the reference logic level LREF (e.g., high logic level) merely by the pull-up voltage, the electronic apparatus 110 may receive the signal SDP on the data pin DAT1 and determine the connecting direction information of the electronic apparatuses 110 and 120 according to whether the signal SDP is maintained at the reference logic level LREF. For instance, when the connecting direction information is the forward connection state, the clock pin CLK1 and the clock pin CLK2 are connected with each other, the data pin DAT1 is connected with the data pin DAT2 which is also pulled up to the reference logic level LREF by the pull-up voltage in the same way. Thereby, the signal SDP on the data pin DAT1 may be maintained at the high logic level. When the connecting direction information is the reverse connection state, the clock pin CLK1 and the data pin DAT2 are connected with each other, and the data pin DAT1 and the clock pin CLK2 are connected with each other. Because the intensity for maintaining the signal SDP on the data pin DAT1 at the reference logic level LREF is low, the signal SDP may not be maintained at the high logic level due to being affected by the clock pin CLK2 (e.g., the detection signal SDT2). Thereby, the connecting direction information of the electronic apparatuses 110 and 120 may be determined through the data pin DAT1.

In the same condition, the electronic apparatus 110 may also determine the connecting direction information of the electronic apparatuses 110 and 120 according to whether the signal on the clock pin CLK1 is equal to the detection signal SDT1. For instance, when the connecting direction information is the forward connection state, the signal SCP on the clock pin CLK1 is interfered by the detection signal SDT2 and is not equal to the detection signal SDT1. On the contrary, when the connecting direction information is the reverse connection state, because the intensity for maintaining the signal on the data pin DAT2 at the reference logic level LREF is low, the waveform of the signal SCP on the clock pin CLK1 is not changed due to being affected by the detection signal SDT2 and is still equal to the detection signal SDT1. Thereby, the connecting direction information of the electronic apparatuses 110 and 120 may be determined through the clock pin CLK1.

On other hand, if it is assumed that the data pins DAT1 and DAT2 are driven to the reference logic level LREF (e.g., the low logic level) through the controllers built in the electronic apparatus 110 and the electronic apparatus 120, the electronic apparatus 110 may determine the connecting direction information of the electronic apparatuses 110 and 120 by determining whether the signal on the clock pin CLK1 is equal to the reference logic level LREF. For instance, when the connecting direction information is the forward connection state, the clock pin CLK1 and the clock pin CLK2 are connected with each other, the data pin DAT1 and the data pin DAT2 are connected with each other. Thus, the signal SCP on the clock pin CLK1 is not affected by the signal on the data pin DAT2 and is not equal to the reference logic level LREF. When the connecting direction information is the reverse connection state, the clock pin CLK1 and the data pin DAT2 are connected with each other, the data pin DAT1 and the clock pin CLK2 are connected with each other. Because the intensity for maintaining the signal on the data pin DAT2 at the reference logic level LREF is high, the signal SCP on the clock pin CLK1 in this case is affected by the signal on the data pin DAT2 and is equal to the reference logic level LREF. Thereby, the connecting direction information of the electronic apparatuses 110 and 120 may be determined through the clock pin CLK1.

After the connection direction of the electronic apparatus 110 and the electronic apparatus 120 is determined, the electronic apparatus 110 (or the electronic apparatus 120) may determine whether to switch the functions of and the signals output by the clock pin CLK1 and the data pin DAT1 (or the clock pin CLK2 and the data pin DAT2) according to the detected connecting direction information, and thereby, a clock signal and a data signal may be output from the appropriate pin positions according to the current connection direction, such that the data transmission system 100 may start to perform the data transmission (i.e., enter the communication mode). For instance, during the connection in the forward direction, the clock signal is output from the clock pin CLK1 to the clock pin CLK2, and the data signal is output from the data pin DAT1 to the data pin DAT2. During the connection in the reverse direction, the functions of the clock pin CLK1 and the data pin DAT1 may be interchanged, such that the data signal is output from the clock pin CLK1 to the data pin DAT2, and the clock signal is output from the data pin DAT1 to the clock pin CLK2. Therefore, the data transmission can be successfully performed between the electronic apparatus 110 and the electronic apparatus 120 which are connected in either the forward direction or the reverse direction, so as to enhance the convenience in use.

It should be noted that within a testing period after the data transmission system 100 of the invention enters the communication mode, if a poor rate of the transmission between the electronic apparatus 110 and the electronic apparatus 120 is over a preset threshold, the electronic apparatus 110 (or the electronic apparatus 120) may change the functions of and the signals output by the clock pins and the data pins as default states, i.e., the electronic apparatus 110 is changed to transmit the clock signal to the clock pin CLK1 and transmit the data signal to data pin DAT1 to avoid data transmission failure caused by mistakenly determined connection direction.

Figure 3:
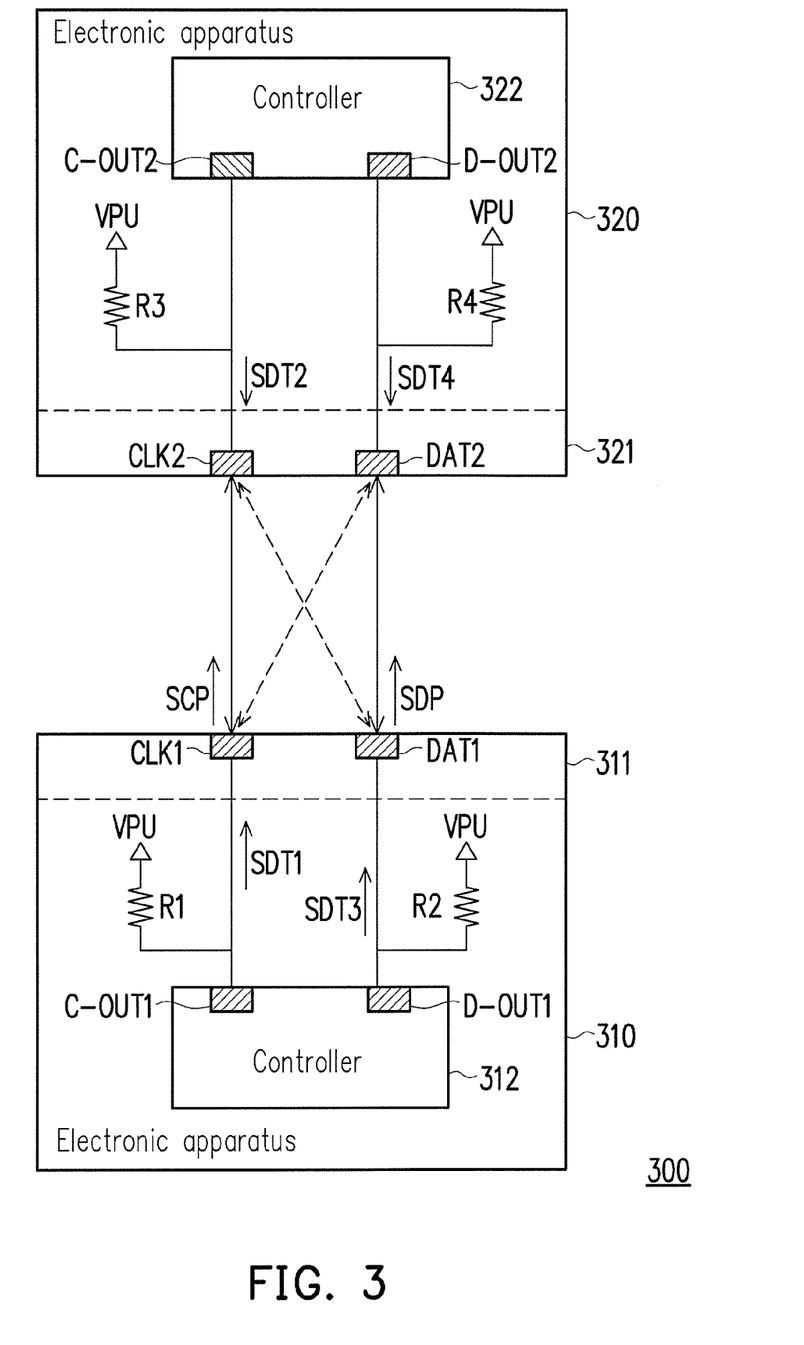
FIG. 3 is a schematic diagram illustrating a data transmission system according to another embodiment of the invention.

Referring to FIG. 3 hereinafter, FIG. 3 is a schematic diagram illustrating a data transmission system according to another embodiment of the invention. A data transmission system 300 includes an electronic apparatus 310 and an electronic apparatus 320. The electronic apparatus 310 has a connection interface 311. The connection interface 311 has a clock pin CLK1 and a data pin DAT1 disposed thereon. The electronic apparatus 320 has a connection interface 321. The connection interface 321 has a clock pin CLK2 and a data pin DAT2 disposed thereon. Positions where the clock pin CLK1 and the data pin DAT1 are disposed on the connection interface 311 and positions where the clock pin CLK2 and the data pin DAT2 are disposed on the connection interface 321 may be corresponding to each other, for example. In the meantime, functions of part of the elements are the same as or similar to the functions of the corresponding elements in the embodiments above and thus, details thereof will not be repeatedly described.

In the present embodiment, referring to FIG. 3, the electronic apparatus 310 and the electronic apparatus 320 respectively include a controller 312 and a controller 322. The controller 312 and the controller 322 are, for example, central processing units (CPUs) with single core or multiple cores, other general purpose or specific purpose programmable microprocessors, digital signal processors (DSPs), programmable controllers, and so on. In FIG. 3, the controller 312 includes a clock output terminal C_OUT1 and a data output terminal D_OUT1. The clock output terminal C_OUT1 is coupled to the clock pin CLK1, and the data output terminal D_OUT1 is coupled to the data pin DAT1. The controller 312 may transmit signals to the clock pin CLK1 and the data pin DAT1 respectively through the clock output terminal C_OUT1 and the data output terminal D_OUT1.

Meanwhile, the controller 322 includes a clock output terminal C_OUT2 and a data output terminal D_OUT2. The clock output terminal C_OUT2 is coupled to the clock pin CLK2, and the data output terminal D_OUT2 is coupled to the data pin DAT2. The controller 322 may transmit signals to the clock pin CLK2 and the data pin DAT2 respectively through the clock output terminal C_OUT2 and the data output terminal D_OUT2.

In FIG. 3, the electronic apparatus 310 further includes pull-up resistors R1 and R2. The pull-up resistor R1 is serially connected between the clock pin CLK1 and the pull-up voltage VPU. The pull-up resistor R2 is serially connected between the data pin DAT1 and the pull-up voltage VPU. The electronic apparatus 320 also further includes pull-up resistors R3 and R4. The pull-up resistor R3 is serially connected between the clock pin CLK2 and the pull-up voltage VPU. The pull-up resistor R4 is serially connected between the data pin DAT2 and the pull-up voltage VPU.

Referring to FIG. 3, in the present embodiment, the clock pin CLK1, the data pin DAT1, the clock pin CLK2 and the data pin DAT2 may be connected with output terminals of open drain buffers (not shown), such that each pin forms an open drain circuit. In operation, when the electronic apparatus 310 and the electronic apparatus 320 are connected with each other, the data transmission system 300 may enter a connecting detection mode. In the connecting detection mode, the controller 312 may transmit a detection signal SDT1 to the clock pin CLK1. The controller 322 may transmit a detection signal SDT2 to the clock pin CLK2. Therein, the detection signal SDT1 and the detection signal SDT2 have different waveforms and frequencies. In this case, the controller 312 may determine whether the electronic apparatus 310 and the electronic apparatus 320 are connected with each other according to whether at least one of the signal SCP on the clock pin CLK1 及 the signal SDP on the data pin DAT1 is varied.

Figure 4:
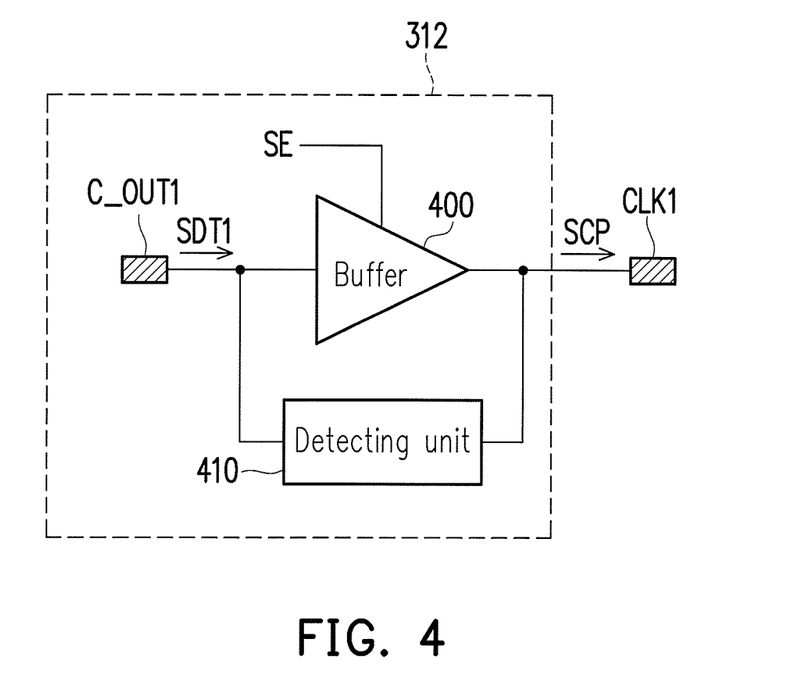
FIG. 4 is a schematic diagram illustrating a part of circuits of the controller according to another embodiment of the invention.

For instance, FIG. 4 is a schematic diagram illustrating a part of circuits of the controller according to another embodiment of the invention. Referring to both FIG. 3 and FIG. 4, the controller 312 may further include a buffer 400 and a detecting unit 410. The buffer 400 has an input terminal, an output terminal and an enable terminal. The input terminal of the buffer 400 is coupled to clock output terminal C_OUT1 transmitting the detection signal SDT1. The output terminal of the buffer 400 is coupled to the clock pin CLK1 and the pull-up resistor R1. And, the buffer 400 may determine whether to output the detection signal SDT1 to the clock pin CLK1 based on the control of the enable terminal (e.g., based on an enable signal SE coupled to the enable terminal).

Additionally, the buffer 400 may be enabled according to the enable signal SE to generate a low logic level of the detection signal SDT1. Meanwhile, the buffer 400 may further be disabled according to the enable signal SE and generate a high logic level part of the detection signal SDT1 through the pull-up resistor R1 pulling up the detection signal SDT1.

The detecting unit 410 is coupled to the input terminal and the output terminal of the buffer 400. The detecting unit 410 may detect the signal SCP on the clock pin CLK1 and the detection signal SDT1 to provide a detection result to the controller 312. Accordingly, the controller 312 may compare the detection signal SDT1 and the signal SCP to determine whether the electronic apparatus 310 and the electronic apparatus 320 are connected with each other.

Continuously referring to FIG. 3, when the electronic apparatus 310 and the electronic apparatus 320 are connected with each other, in an embodiment, the data pins DAT1 and DAT2 are pulled up to the reference logic level LREF (e.g., the high logic level) merely by the pull-up voltage VPU. That is, the data pins DAT1 and DAT2 are driven in a condition that the controllers 312 and 322 do not transmit the signals. Because intensities for the signals to maintain the data pins DAT1 and DAT2 at the reference logic level LREF are weak, the electronic apparatus 310 may receive the signal SDP on the data pin DAT1 and detect whether the signal SDP is maintained at the high logic level to determine connecting direction information of the electronic apparatus 310 and the electronic apparatus 320.

To be specific, the controller 312 may compare the signal on the data pin DAT1. When the signal SDP on the data pin DAT1 is maintained at the high logic level, the controller 312 may determine that the data pin DAT1 is connected with the data pin DAT2 which is also pulled up to the high logic level in the same way. Thus, the connecting direction information is the forward connection state. Otherwise, when the signal on the data pin DAT1 Is not maintained at the high logic level, the controller 312 may determine that the data pin DAT1 is connected with the clock pin CLK2 due to being affected by the detection signal SDT2, for example, and thus, the connecting direction information is the reverse connection state.

In another embodiment, the data pins DAT1 and DAT2 are driven to the reference logic level LREF (e.g., the low logic level) through the controllers built in the electronic apparatus 110 and the electronic apparatus 120. In this condition, the controllers 312 and 322 may respectively provide detection signals SDT3 and SDT4 to the data pins DAT1 and DAT2 to drive each of the data pins DAT1 and DAT2 to the reference logic level LREF. In this case, because the intensities of the signals for maintaining the data pins DAT1 and DAT2 at the reference logic level LREF are high, the electronic apparatus 310 may receive the signal SCP on the clock pin CLK1 and compare whether the signal SCP is equal to the reference logic level LREF due to being affected by the data pin DAT2 to determine the connecting direction information of the electronic apparatus 310 and the electronic apparatus 320.

To be specific, the controller 312 may compare the signal SCP on the clock pin CLK1. When the signal SCP on the clock pin CLK1 is not affected by the signal on the data pin DAT2 and is not equal to the reference logic level LREF, the controller 312 may determine that the clock pin CLK1 is connected with the clock pin CLK2, and the connecting direction information is the forward connection state. Otherwise, when the signal SCP on the clock pin CLK1 is equal to the reference logic level LREF due to being affected by the signal on the data pin DAT2, the controller 312 may determine that the clock pin CLK1 is connected with the clock pin DAT2, and the connecting direction information is the reverse connection state.

Accordingly, after the connection direction of the electronic apparatus 310 and the electronic apparatus 320 is determined, the electronic apparatus 310 (or the electronic apparatus 320) may determine whether to switch the functions of and the signals output by the e clock pin CLK1 and the data pin DAT1 (or the clock pin CLK2 and the data pin DAT2) according to the detected connecting direction information, and thereby, a clock signal and a data signal may be output from the appropriate pin positions according to the current connection direction, such that the data transmission system 300 may start to perform the data transmission (i.e., enter the communication mode).

Figure 5:
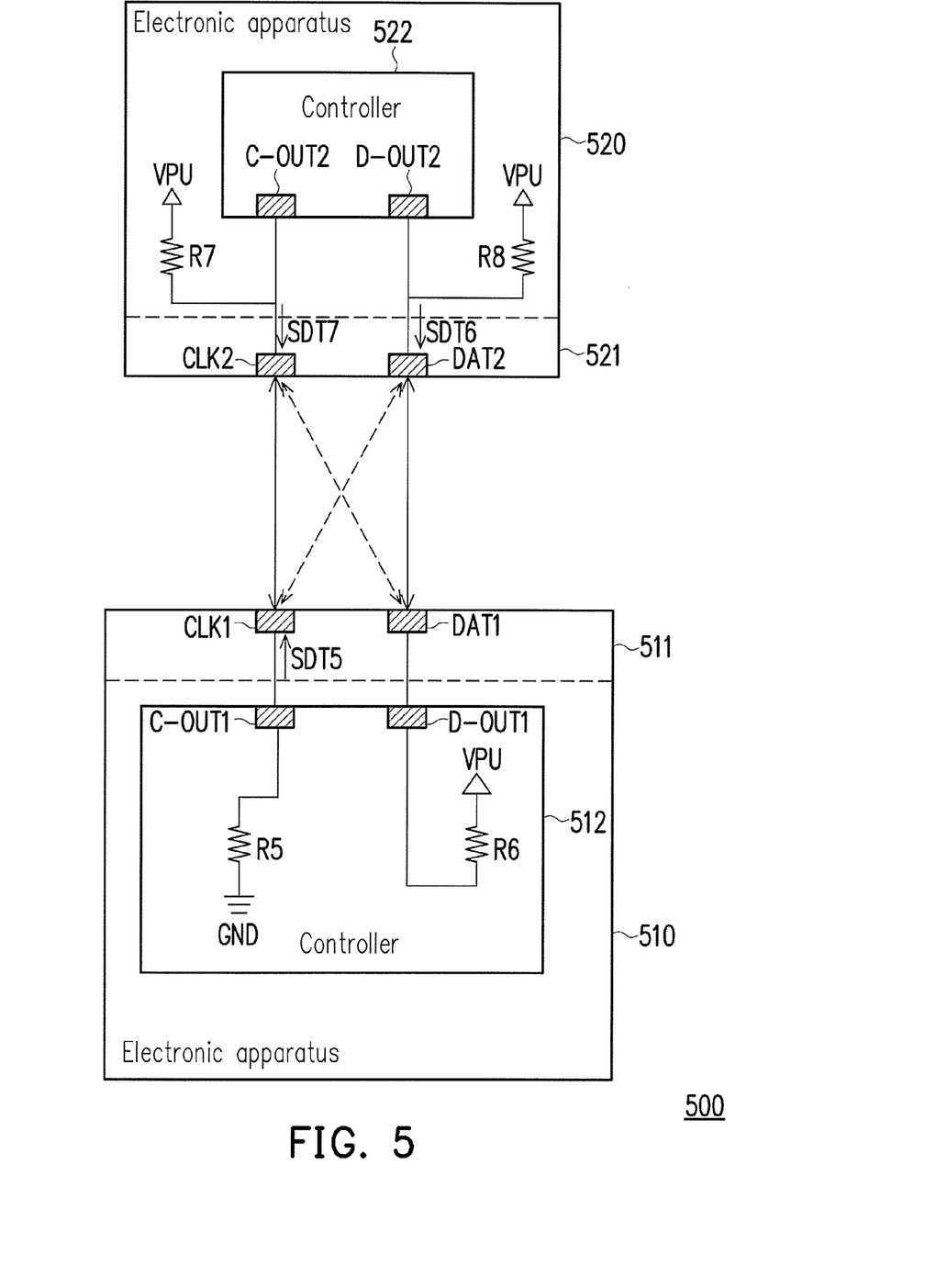
FIG. 5 is a schematic diagram illustrating a data transmission system according to another embodiment of the invention.

Referring to FIG. 5 hereinafter, FIG. 5 is a schematic diagram illustrating a data transmission system according to another embodiment of the invention. A data transmission system 500 includes an electronic apparatus 510 and an electronic apparatus 520. The electronic apparatus 510 has a connection interface 511. The connection interface 511 has a clock pin CLK1 and a data pin DAT1 disposed thereon. The electronic apparatus 520 has a connection interface 521. The connection interface 521 has a clock pin CLK2 and a data pin DAT2 disposed thereon. Positions where the clock pin CLK1 and the data pin DAT1 are disposed on the connection interface 511 and positions where the clock pin CLK2 and the data pin DAT2 are disposed on the connection interface 521 ± clock pin CLK1, data pin DAT1 及 clock pin CLK2, data pin DAT2 may be corresponding to each other, for example. In the meantime, functions of part of the elements are the same as or similar to the functions of the corresponding elements in the embodiments above and thus, details thereof will not be repeatedly described.

In FIG. 5, the electronic apparatus 510 further includes a controller 512. The controller 512 includes a clock output terminal C_OUT1 and a data output terminal D_OUT1. The clock output terminal C_OUT1 is coupled to the clock pin CLK1, and the data output terminal D_OUT1 is coupled to the data pin DAT1. The controller 512 may transmit signals to the clock pin CLK1 and the data pin DAT1 respectively through the clock output terminal C_OUT1 and the data output terminal D_OUT1.

Meanwhile, the electronic apparatus 520 also includes a controller 522. The controller 522 includes a clock output terminal C_OUT2 and a data output terminal D_OUT2. The clock output terminal C_OUT2 is coupled to the clock pin CLK2, data output terminal D_OUT2 is coupled to data pin DAT2. The controller 522 may also transmit signals to the clock pin CLK2 and the data pin DAT2 respectively through the clock output terminal C_OUT2 and the data output terminal D_OUT2.

In addition, electronic apparatus 510 further includes a ground resistor R5 and a pull-up resistor R6. The ground resistor R5 is serially connected between the clock pin CLK1 and a reference ground voltage GND. The pull-up resistor R6 is serially connected between the data pin DAT1 and a pull-up voltage VPU. In the present embodiment, referring to FIG. 5, the ground resistor R5 and the pull-up resistor R6 are disposed inside the controller 512 of the electronic apparatus 510 and serially connected with the clock pin CLK1 and the data pin DAT1 respectively through the clock output terminal C_OUT1 and the data output terminal D_OUT1. It should be noted that the disposition of the ground resistor R5 and the pull-up resistor R6 is not limited in the present embodiments of the invention, and the ground resistor R5 and the pull-up resistor R6 may be disposed outside the controller 512 in another embodiment.

The electronic apparatus 520 further includes a pull-up resistor R7 and a pull-up resistor R8. The pull-up resistor R7 is serially connected between the clock pin CLK2 and the pull-up voltage VPU. The pull-up resistor R8 is serially connected between the data pin DAT2 and the pull-up voltage VPU. In the present embodiment, a resistance of the ground resistor R5 is, for example, greater than that of the pull-up resistor R7 and that of the pull-up resistor R8.

TABLE (1)

| Step | Electronic apparatus 510 | | | | Electronic apparatus 520 | | | |
|---|---|---|---|---|---|---|---|---|
| | CLK1 | | DAT1 | | CLK2 | | DAT2 | |
| 1 | GPI | L | GPI | H | GPI | H | GPI | H |
| 2 | GPI | H | GPI | H | GPI | H | GPI | H |
| 3 | GPO | L | GPI | H | GPI | L | GPI | H |
| 4 | GPO | L | GPI | L | GPI | L | GPO | L |
| 5 | GPI | H | GPI | L | GPI | H | GPO | L |

Table (1) illustrates input/output states and voltage levels of the clock pin CLK1, the data pin DAT1, the clock pin CLK2 and the data pin DAT2 respectively during the process of detecting whether the electronic apparatus 510 and the electronic apparatus 520 are connected with each other and connecting direction information thereof when the electronic apparatus 510 and the electronic apparatus 520 of the present embodiment are connected in the forward direction, where "H" represents the high logic level, and "L" represents the low logic level. In the present embodiment, the clock pin CLK1, the data pin DAT1, the clock pin CLK2 and the data pin DAT2 may be, for example, general purpose input output (GPIO) pins, and thus, the controller 512 of the electronic apparatus 510 and the controller 522 of the electronic apparatus 520 may arbitrarily set the clock pin CLK1, the data pin DAT1, the clock pin CLK2 and the data pin DAT2 as a general purpose input (GPI) or a general purpose output (GPO) type. Operations performed by the elements illustrated in FIG. 5 will be described with reference to Table (1) hereinafter.

Referring to both FIG. 5 and Table (1), in step 1 of Table (1), the clock pin CLK1, data pin DAT1, the clock pin CLK2 and the data pin DAT2 are set as the GPI type. And, the clock pin CLK1 is set at the low logic level L according to the reference ground voltage GND, while the data pin DAT1, the clock pin CLK2 and the data pin DAT2 are set at the high logic level H according to the pull-up voltage VPU.

Then, when the electronic apparatus 510 and the electronic apparatus 520 are connected with each other, in step 2 of Table (1), the controller 512 may determine whether the electronic apparatus 510 and the electronic apparatus 520 are connected with each other by comparing whether the signal on the clock pin CLK1 is maintained at the low logic level L dropped by the reference ground voltage GND. In step 2 of Table (1), when the electronic apparatus 510 detects that the level of the clock pin CLK1 is changed to the high logic level H, it represents that the level of the clock pin CLK1 is changed due to being and connected with and affected by the clock pin CLK2 or the data pin DAT2, so as to determine that the electronic apparatus 510 and the electronic apparatus 520 are connected with each other.

Then, when the electronic apparatus 510 and the electronic apparatus 520 are connected with each other, in step 3 of Table (1), the controller 512 of the electronic apparatus 510 may set the clock pin CLK1 as the GPO type. And, the controller 512 may transmit a detection signal SDT5 at the low logic level L to the clock pin CLK1 to drop the clock pin CLK1 to the low logic level L. The controller 522 of the electronic apparatus 520 may then determine the connecting direction information of the electronic apparatus 510 and the electronic apparatus 520 according to whether the pin (which is changed to the low logic level L) receiving the detection signal SDT5 is the clock pin CLK2 or the data pin DAT2.

To be specific, the controller 522 may detect whether signals (levels) on the clock pin CLK2 and the data pin DAT2 are equal to the detection signal SDT5 (i.e., the low logic level L). When the signal on the clock pin CLK2 is equal to the detection signal SDT5, the connecting direction information is determined as the forward connection state. When the signal on the data pin DAT2 is equal to the detection signal SDT5, the connecting direction information is determined as the reverse connection state. In step 3 of the Table (1), the clock pin CLK2 is changed to the low logic level L, such that the controller 522 may acquire that the connecting direction information is the forward connection state.

Afterwards, in step 4 of Table (1), the controller 522 of the electronic apparatus 520 may set the data pin DAT2 as the GPO type and transmit a detection signal SDT6 at the low logic level L to the data pin DAT2 to adjust the data pin DAT2 from the high logic level H to the low logic level L, such that the electronic apparatus 520 may be ready for entering the communication mode. Accordingly, in step 4 of Table (1), the data pin DAT1 of the electronic apparatus 510 is correspondingly changed to the low logic level L due to being connected with the data pin DAT2.

Then, in step 5 of Table (1), the controller 512 of the electronic apparatus 510 detects that the data pin DAT1 is changed to the low logic level L and sets the clock pin CLK1 as the GPI type, such that the electronic apparatus 510 may be ready for entering the communication mode. In this case, the electronic apparatus 510 and the electronic apparatus 520 are connected with each other in the forward direction and thus, do not have to switch the functions of and the signals output by the clock pin CLK1 and the data pin DAT1 (or the clock pin CLK2 and the data pin DAT2).

Lastly, the data transmission between the electronic apparatus 510 and the electronic apparatus 520 may start by means of adjusting the clock pin CLK1 of the electronic apparatus 510 and the clock pin CLK2 of the electronic apparatus 520 to the high logic level H.

TABLE (2)

| Step | Electronic apparatus 510 | | | | Electronic apparatus 520 | | | |
|---|---|---|---|---|---|---|---|---|
| | CLK1 | | DAT1 | | CLK2 | | DAT2 | |
| 1 | GPI | L | GPI | H | GPI | H | GPI | H |
| 2 | GPI | H | GPI | H | GPI | H | GPI | H |
| 3 | GPO | L | GPI | H | GPI | H | GPI | L |
| 4 | GPO | L | GPI | L | GPO | L | GPI | L |
| 5 | GPI | H | GPI | L | GPO | L | GPI | H |

Table (2) illustrates the input/output states and the voltage levels of the clock pin CLK1, the data pin DAT1, the clock pin CLK2 and the data pin DAT2 respectively during the process of detecting whether the electronic apparatus 510 and the electronic apparatus 520 are connected with each other and connecting direction information thereof when the electronic apparatus 510 and the electronic apparatus 520 of the present embodiment are connected in the reverse direction. Details with respect to steps 1 and 2 of Table (2) are the same as or similar to steps 1 and 2 of Table (1) and thus, will not be repeatedly described.

Being different from Table (1) above, in step 3 of Table (2), the data pin DAT2 is changed to the low logic level L, such that the controller 522 may acquire that the connecting direction information is the reverse connection state.

Then, in step 4 of Table (2), the controller 522 of the electronic apparatus 520 may set the clock pin CLK2 as the GPO type and transmit a detection signal SDT7 at the low logic level L to the clock pin CLK2 to adjust the clock pin CLK2 from the high logic level H to the low logic level L, such that the electronic apparatus 520 may be ready for entering the communication mode. Accordingly, in step 4 of Table (2), the data pin DAT1 of the electronic apparatus 510 is correspondingly changed to the low logic level due to being connected with the clock pin CLK2.

Then, in step 5 of Table (2), the controller 512 of the electronic apparatus 510 detects that the data pin DAT1 is changed to the low logic level L and sets the clock pin CLK1 as the GPI type, such that the electronic apparatus 510 may be ready for entering the communication mode. In this case, the electronic apparatus 510 and the electronic apparatus 520 are connected with each other in the reverse direction, and thus, one of the electronic apparatus 510 and the electronic apparatus 520 has to switch the functions of and the signals output by the clock pin CLK1 and the data pin DAT1 or the clock pin CLK2 and the data pin DAT2.

Lastly, the data transmission between the electronic apparatus 510 and the electronic apparatus 520 may start by means of adjusting the clock pin CLK1 of the electronic apparatus 510 and the clock pin CLK2 of the electronic apparatus 520 to the high logic level H.

Figure 6:
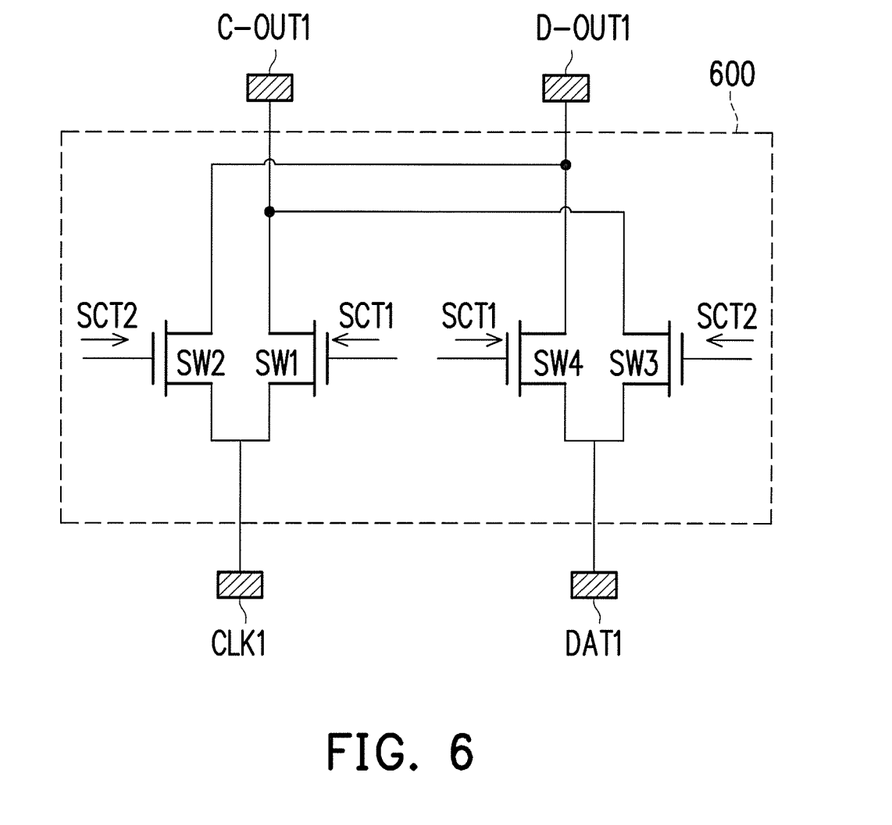
FIG. 6 is a schematic diagram illustrating switching units according to an embodiment of the invention.

Additionally, in part of the embodiments, a switching unit may be disposed in each electronic apparatus for switching the output signals. FIG. 6 is a schematic diagram illustrating switching units according to an embodiment of the invention. A switching unit 600 includes switches SW1 to SW4. The switches SW1 to SW4 may be, for example, N-type or P-type metal-oxide-semidrive or field-effect transistors (MOSFETs), and the embodiments of the invention are not limited thereto. Each of the switches SW1 to SW4 has a first terminal, a second terminal and a control terminal and determines whether to turn on the first terminal and the second terminal according to a voltage applied to the control terminal. With the structure of the switching unit 600, the first terminal of the switch SW1 is coupled to the clock output terminal C_OUT1 of the electronic apparatus, the second terminal of the switch SW1 is coupled to the clock pin CLK1, and the control terminal of the switch SW1 is coupled to a control signal SCT1. The first terminal of the switch SW2 is coupled to the data output terminal D_OUT1 of the electronic apparatus, the second terminal of the switch SW2 is coupled to the clock pin CLK1, and the control terminal of the switch SW2 is coupled to the control signal SCT2. The first terminal of the switch SW3 is coupled to the clock output terminal C_OUT1, the second terminal of the switch SW3 is coupled to data pin DAT1, and the control terminal of the switch SW3 is coupled to a control signal SCT2. The first terminal of the switch SW4 is coupled to the data output terminal D_OUT1, the second terminal of the switch SW4 is coupled to the data pin DAT1, the control terminal of the switch SW4 is coupled to the control signal SCT1. The control signals SCT1 and SCT2 may be generated according to the connecting direction information between the electronic apparatuses, so as to adaptively switch between the turned-on switches.

Figure 7:
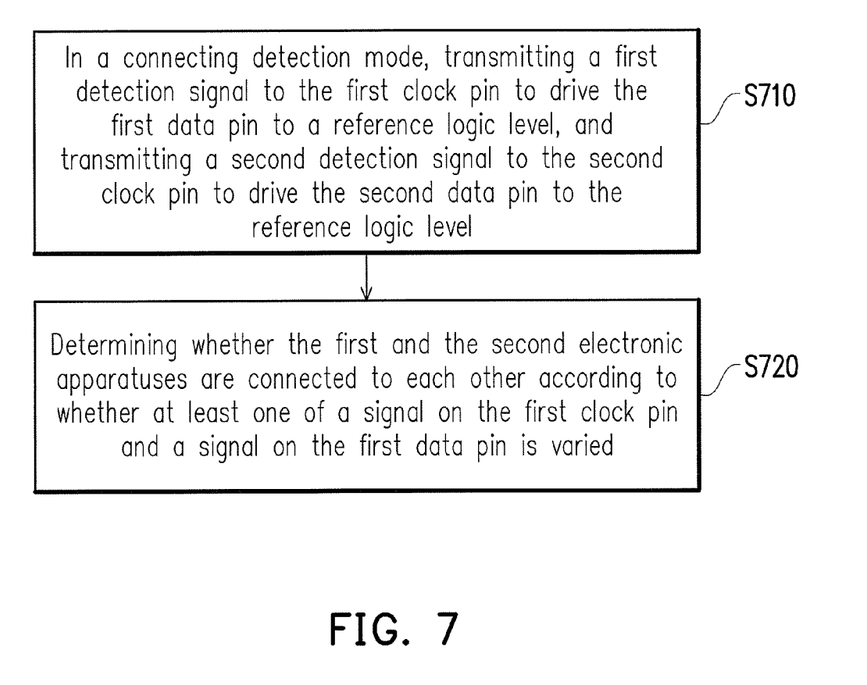
FIG. 7 is a flowchart illustrating a data transmission method according to an embodiment of the invention.

FIG. 7 is a flowchart illustrating a data transmission method according to an embodiment of the invention. The data transmission method of the present embodiment is applicable to the data transmission system illustrated in FIG. 1. Referring to FIG. 1 and FIG. 7, in step S710, in a connecting detection mode, the electronic apparatus 110 transmits a detection signal SDT1 to the clock pin CLK1 and drives the data pin DAT1 to a reference logic level LREF, and the electronic apparatus 120 transmits a detection signal SDT2 to the clock pin CLK2 and drives the data pin DAT2 to the reference logic level LREF. In the meantime, in step S720, the electronic apparatus 110 determines whether the electronic apparatus 110 and the electronic apparatus 120 are connected with each other according to whether at least one of a signal on the clock pin CLK1 and a signal on the data pin DAT1 is varied.

Additionally, after step S720, when the electronic apparatus 110 and the electronic apparatus 120 are connected with each other, the electronic apparatus 110 determines whether the signal SDP on the data pin DAT1 or the signal SCP on the clock pin CLK1 is equal to the corresponding reference logic level, so as to determine connecting direction information of the electronic apparatus 110 and the electronic apparatus 120.

Figure 8:
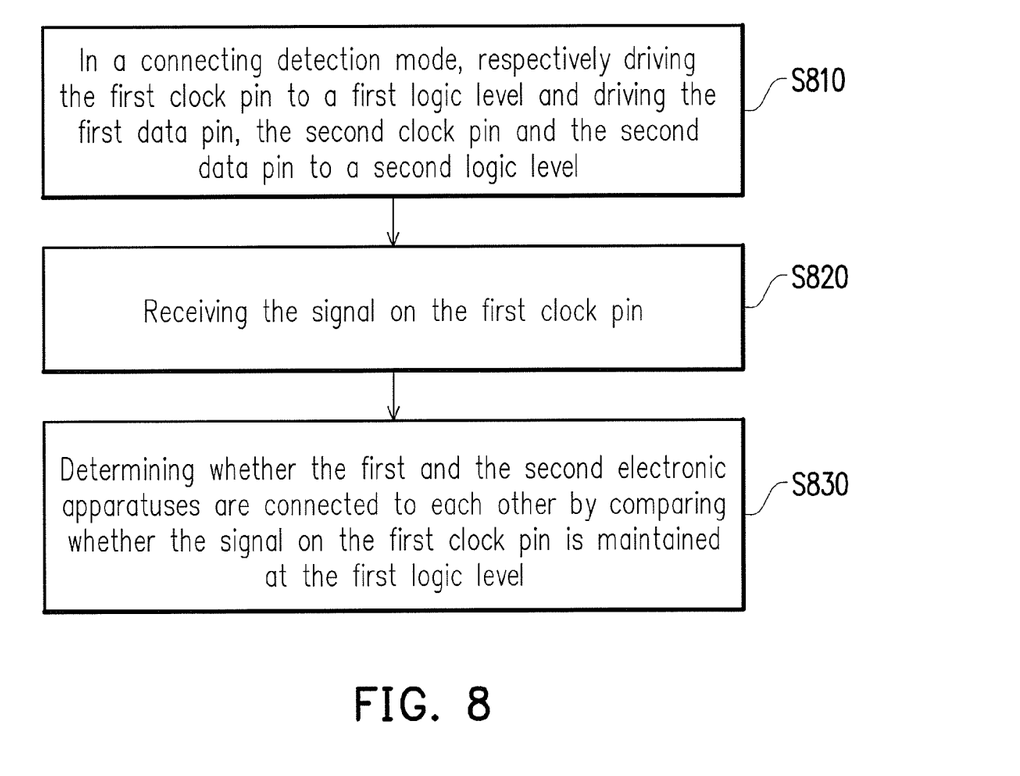
FIG. 8 is a flowchart illustrating a data transmission method according to an embodiment of the invention.

FIG. 8 is a flowchart illustrating a data transmission method according to an embodiment of the invention. The data transmission method of the present embodiment is applicable to the data transmission system illustrated in FIG. 1. Referring to FIG. 1 and FIG. 8, in step S810, in a connecting detection mode, the electronic apparatus 110 drops the clock pin CLK1 to a low logic level (i.e., a first logic level) and drives the data pin DAT1 to the high logic level (second logic level), and the electronic apparatus 120 drives the clock pin CLK2 and the data pin DAT2 to a high logic level. Then, in step S820, the electronic apparatus 110 receives a signal on the clock pin CLK1. Meanwhile, in step S830, the electronic apparatus 110 compares whether the signal on the clock pin CLK1 is maintained at the low logic level, so as to determine whether the electronic apparatus 110 and the electronic apparatus 120 are connected with each other.

Additionally, after step S830, when the electronic apparatus 110 and the electronic apparatus 120 are connected with each other, the electronic apparatus 110 also transmits the detection signal SDT5 to the clock pin CLK1. And, the electronic apparatus 120 determines the connecting direction information of the electronic apparatus 110 and the electronic apparatus 120 according to whether the pin receiving the detection signal SDT5 is the clock pin CLK2 or the data pin DAT2.

To summarize, in the invention, two electronic apparatuses when being connected with each other can transmit the detection signals of the pins (e.g., the clock pin and the data pin) that are connected with each other and can determine the connecting state and the connection direction between the electronic apparatuses according to the signal (i.e., the voltage level) of each pin. In this way, the functions of and the signals output by the pins of the apparatuses can be adaptively switched according to the determination result, such that the data transmission can be successfully performed between the electronic apparatuses which are connected in either the forward direction or the reverse direction, so as to enhance the convenience in use.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data transmission system, comprising:
a first electronic apparatus, having a first connection interface, and a first clock pin and a first data pin being disposed on the first connection interface, wherein the first electronic apparatus further comprises a switching unit, the switching unit comprising:
a first switch, having a first terminal, a second terminal and a control terminal, wherein the first terminal of the first switch is coupled to a clock output terminal of the first electronic apparatus, the second terminal of the first switch is coupled to the first clock pin, and the control terminal of the first switch is coupled to a first control signal;
a second switch, having a first terminal, a second terminal and a control terminal, wherein the first terminal of the second switch is coupled to a data output terminal of the first electronic apparatus, the second terminal of the second switch is coupled to the first clock pin, and the control terminal of the second switch is coupled to a second control signal;
a third switch, having a first terminal, a second terminal and a control terminal, wherein the first terminal of the third switch is coupled to the clock output terminal, the second terminal of the third switch is coupled to the first data pin, and the control terminal of the third switch is coupled to the second control signal; and
a fourth switch, having a first terminal, a second terminal and a control terminal, wherein the first terminal of the fourth switch is coupled to the data output terminal, the second terminal of the fourth switch is coupled to the first data pin, and the control terminal of the fourth switch is coupled to the first control signal,
wherein the first electronic apparatus generates the corresponding first control signal and second control signal according to the connecting direction information of the first and the second electronic apparatuses; and
a second electronic apparatus, having a second connection interface, and a second clock pin and a second data pin being disposed on the second connection interface,
wherein in a connecting detection mode, the first electronic apparatus transmits a first detection signal to the first clock pin and drives the first data pin to a reference logic level, the second electronic apparatus transmits a second detection signal to the second clock pin and drives the second data pin to the reference logic level, and the first electronic apparatus determines whether the first and the second electronic apparatuses are connected to each other according to whether at least one of a signal on the first clock pin and a signal on the first data pin is varied.

2. The data transmission system according to claim 1, wherein when the first and the second electronic apparatuses are connected to each other, the first electronic apparatus determines connecting direction information of the first and the second electronic apparatuses according to whether the signal on the first data pin is maintained at the reference logic level.

3. The data transmission system according to claim 2, wherein when the first and the second electronic apparatuses are connected to each other, the first electronic apparatus determines the connecting direction information of the first and the second electronic apparatuses according to whether the signal on the first clock pin is equal to the first detection signal.

4. The data transmission system according to claim 2, wherein the connecting direction information comprises a forward connection state and a reverse connection state, when the connecting direction information is the forward connection state, the first clock pin is connected to the second clock pin, and the first data pin is connected to the second data pin, and when the connecting direction information is the reverse connection state, the first clock pin is connected to the second data pin, and the first data pin is connected to the second clock pin.

5. The data transmission system according to claim 4, wherein the first electronic apparatus further comprises:
a first controller, determining the connecting direction information as the forward connection state when the signal on the first data pin is maintained at the reference logic level and determining the connecting direction information as the reverse connection state when the signal on the first data pin is not maintained at the reference logic level.

6. The data transmission system according to claim 2, wherein
the first electronic apparatus further comprises:
a first pull-up resistor, serially connected between the first clock pin and a pull-up voltage; and
a second pull-up resistor, serially connected between the first data pin and the pull-up voltage, and
the second electronic apparatus further comprises:
a third pull-up resistor, serially connected between the second clock pin and the pull-up voltage; and
a fourth pull-up resistor, serially connected between the second data pin and the pull-up voltage.

7. The data transmission system according to claim 5, wherein the first controller further comprises:
a buffer, having an input terminal, an output terminal and an enable terminal, wherein the input terminal of the buffer is coupled to the first detection signal, the output terminal of the buffer is coupled to the first clock pin, and the buffer determines whether to output the first detection signal based on the control of the enable terminal; and
a detecting unit, coupled to the input terminal and the output terminal of the buffer and detecting the signal on the first clock pin and the first detection signal, so as to provide a detection result to the first controller,
wherein the output terminal of the buffer is connected with a pull-up resistor.

8. The data transmission system according to claim 1, wherein when the first and the second electronic apparatuses are connected to each other, the first electronic apparatus determines connecting direction information of the first and the second electronic apparatuses according to whether the signal on the first clock pin is equal to the reference logic level.

9. The data transmission system according to claim 8, wherein the connecting direction information comprises a forward connection state and a reverse connection state, when the connecting direction information is the forward connection state, the first clock pin is connected to the second clock pin, and the first data pin is connected to the second data pin, and when the connecting direction information is the reverse connection state, the first clock pin is connected to the second data pin, and the first data pin is connected to the second clock pin.

10. The data transmission system according to claim 9, wherein
the first electronic apparatus further comprises:
a first controller, providing a third detection signal to the first data pin to drive the first data pin to the reference logic level, and
the second electronic apparatus further comprises:
a second controller, providing a fourth detection signal to the second data pin to drive the second data pin to the reference logic level,
wherein when the signal on the first clock pin is not equal to the reference logic level, the first controller determines the connecting direction information as the forward connection state, and when the signal on the first clock pin is equal to the reference logic level, the first controller determines the connecting direction information as the reverse connection state.

11. The data transmission system according to claim 1, wherein if a poor rate of the transmission between the first electronic apparatus and the second electronic apparatus within a testing period after entering a communication mode is over a preset threshold, the first electronic apparatus is changed to transmit a data signal to the first data pin.

12. A data transmission system, comprising:
a first electronic apparatus, having a first connection interface, and a first clock pin and a first data pin being disposed on the first connection interface; and
a second electronic apparatus, having a second connection interface, and a second clock pin and a second data pin being disposed on the second connection interface,
wherein in a connecting detection mode, the first electronic apparatus drives the first clock pin to a first logic level and drives the first data pin to a second logic level, the second electronic apparatus drives the second clock pin and the second data pin to the second logic level, and the first electronic apparatus receives a signal on the first clock pin to compare whether the signal on the first clock pin is maintained at the first logic level, so as to determine whether the first and the second electronic apparatuses are connected to each other, wherein when the first and the second electronic apparatuses are connected to each other, the first electronic apparatus transmits a fifth detection signal to the first clock pin, the second electronic apparatus determines connecting direction information of the first and the second electronic apparatuses according to whether the second clock pin or the second data pin receives the fifth detection signal, wherein the connecting direction information comprises a forward connection state and a reverse connection state, when the connecting direction information is the forward connection state, the first clock pin is connected to the second clock pin, and the first data pin is connected to the second data pin, when the connecting direction information is the reverse connection state, the first clock pin is connected to the second data pin, and the first data pin is connected to the second clock pin, wherein the first electronic apparatus further comprises:

a first controller, generating the fifth detection signal, and the second electronic apparatus further comprises:

a second controller, detecting whether signals on the second clock pin and the second data pin are equal to the fifth detection signal, determining the connecting direction information as the forward connection state and transmitting a sixth detection signal to the second data pin when the signal on the second clock pin is equal to the fifth detection signal, and determining the connecting direction information as the reverse connection state and transmitting a seventh detection signal to the second clock pin when the signal on the second data pin is equal to the fifth detection signal.

13. The data transmission system according to claim 12, wherein the fifth detection signal, the sixth detection signal and the seventh detection signal are at a low logic level.

14. The data transmission system according to claim 12, wherein the first electronic apparatus further comprises:

a ground resistor, serially connected between the first clock pin and a reference ground voltage; and a first pull-up resistor, serially connected between the first data pin and a pull-up voltage, and the second electronic apparatus further comprises:

a second pull-up resistor, serially connected between the second clock pin and the pull-up voltage; and a third pull-up resistor, serially connected between the second data pin and the pull-up voltage, wherein a resistance of the ground resistor is greater than a resistance of the second pull-up resistor and a resistance of the third pull-up resistor.

15. A data transmission system, comprising:

a first electronic apparatus, having a first connection interface, and a first clock pin and a first data pin being disposed on the first connection interface, wherein the first electronic apparatus further comprises:

a first controller, determining the connecting direction information as the forward connection state when the signal on the first data pin is maintained at the reference logic level and determining the connecting direction information as the reverse connection state when the signal on the first data pin is not maintained at the reference logic level, wherein the first controller further comprises:

a buffer, having an input terminal, an output terminal and an enable terminal, wherein the input terminal of the buffer is coupled to the first detection signal, the output terminal of the buffer is coupled to the first clock pin, and the buffer determines whether to output the first detection signal based on the control of the enable terminal; and a detecting unit, coupled to the input terminal and the output terminal of the buffer and detecting the signal on the first clock pin and the first detection signal, so as to provide a detection result to the first controller, wherein the output terminal of the buffer is connected with a pull-up resistor; and a second electronic apparatus, having a second connection interface, and a second clock pin and a second data pin being disposed on the second connection interface, wherein in a connecting detection mode, the first electronic apparatus transmits a first detection signal to the first clock pin and drives the first data pin to a reference logic level, the second electronic apparatus transmits a second detection signal to the second clock pin and drives the second data pin to the reference logic level, and the first electronic apparatus determines whether the first and the second electronic apparatuses are connected to each other according to whether at least one of a signal on the first clock pin and a signal on the first data pin is varied, wherein when the first and the second electronic apparatuses are connected to each other, the first electronic apparatus determines connecting direction information of the first and the second electronic apparatuses according to whether the signal on the first data pin is maintained at the reference logic level, wherein the connecting direction information comprises a forward connection state and a reverse connection state, when the connecting direction information is the forward connection state, the first clock pin is connected to the second clock pin, and the first data pin is connected to the second data pin, and when the connecting direction information is the reverse connection state, the first clock pin is connected to the second data pin, and the first data pin is connected to the second clock pin.

* * * * *